Nov. 23, 1943. E. E. HEWITT ET AL 2,334,823
RAILWAY CAR GENERATOR CONTROL
Filed Feb. 28, 1942 3 Sheets-Sheet 1
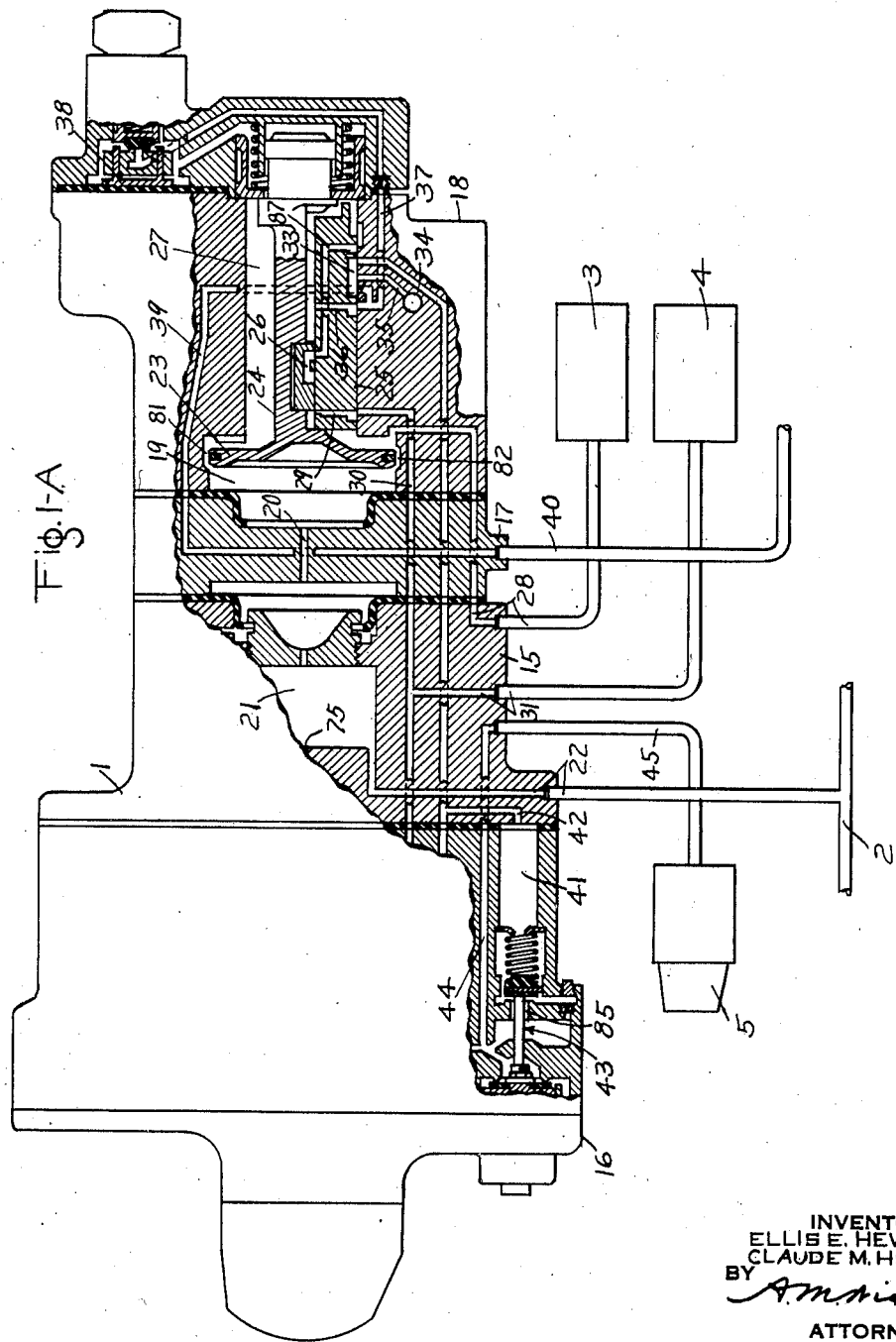
INVENTORS
ELLIS E. HEWITT
CLAUDE M. HINES
BY
A. M. Higgins
ATTORNEY

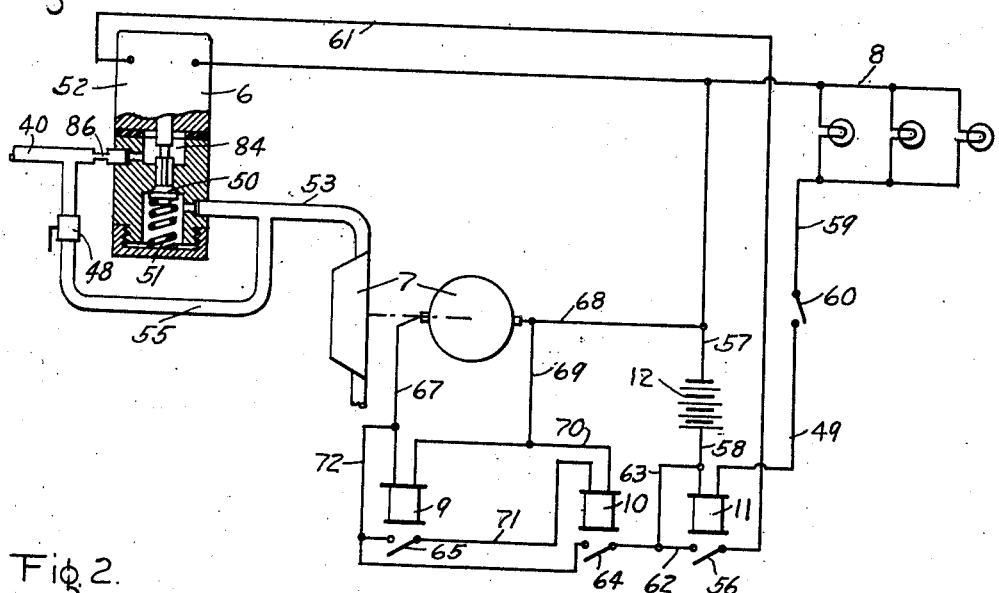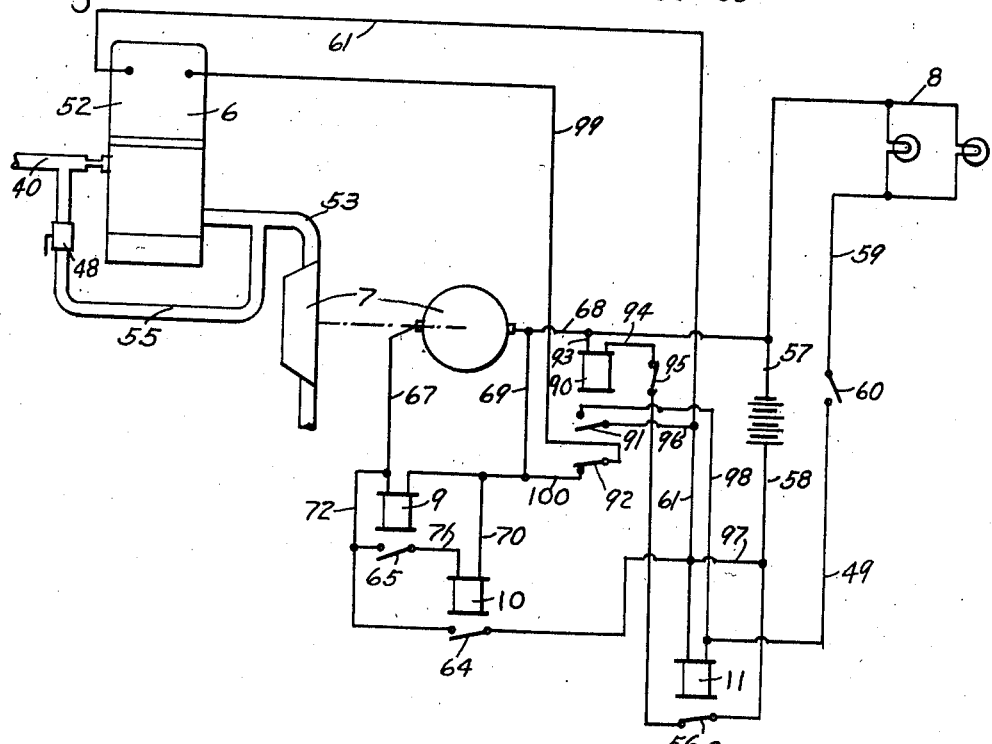

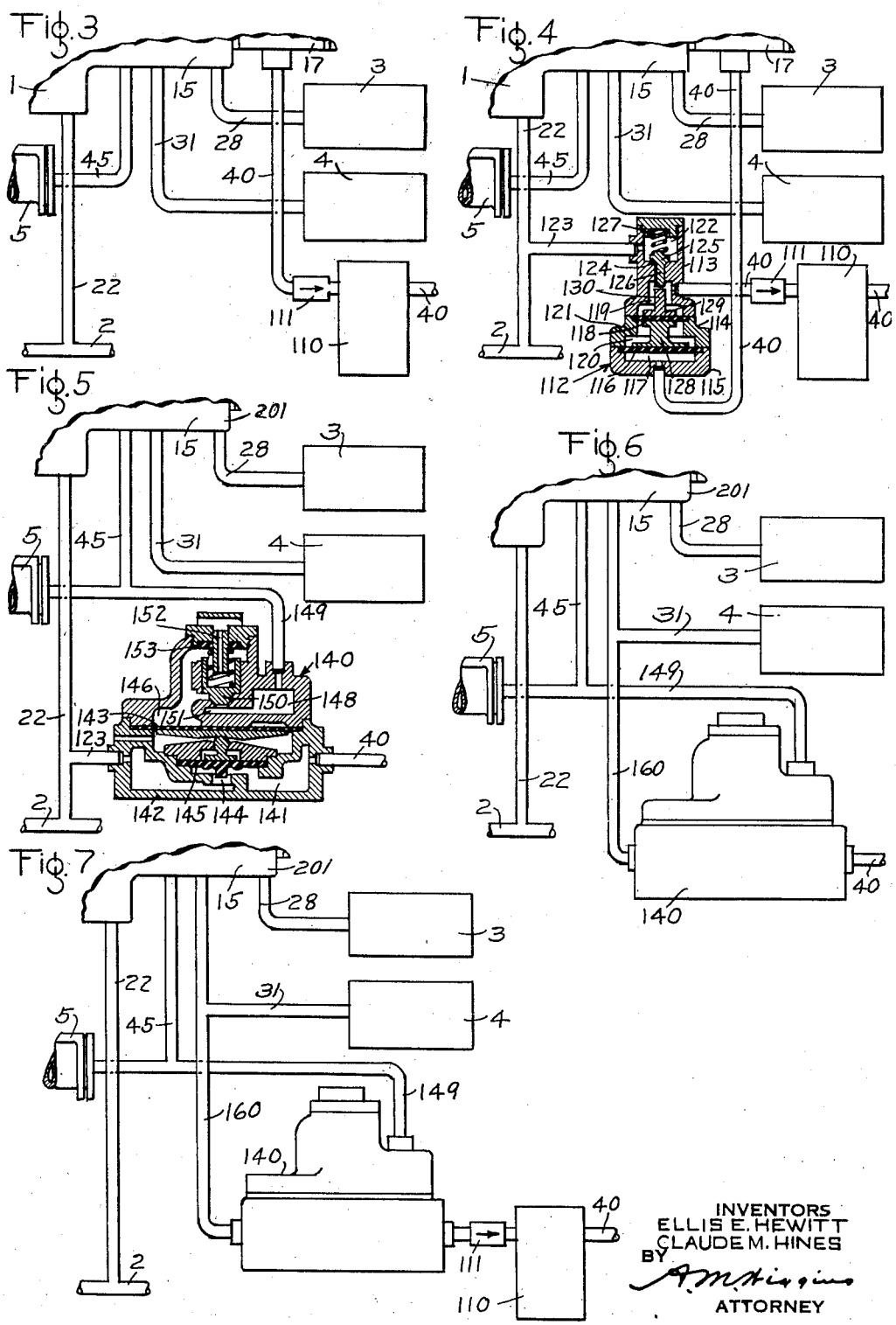

Patented Nov. 23, 1943

2,334,823

UNITED STATES PATENT OFFICE 2,334,823

RAILWAY CAR GENERATOR CONTROL

Ellis E. Hewitt, Edgewood, and Claude M. Hines, Pittsburgh, Pa., assignors to The Westinghouse Air Brake Company, Wilmerding, Pa., a corporation of Pennsylvania Application February 28, 1942, Serial No. 432,775

30 Claims. (Cl. 303—1)

This invention relates to caboose or cabin cars, of the type which are usually coupled to the rear end of a freight train, and the principal object of the invention is to provide an electric lighting system for such cars.

Heretofore caboose or cabin cars have been illuminated by means of oil lights. It is well known that passenger cars are provided with electric lights, the power for the lighting system being obtained from a storage battery which is maintained charged by means of an axle driven generator. This lighting system while satisfactory for lighting passenger cars would be of little or no use on caboose or cabin cars for the reason that in freight train service, where such cars are employed, there may be too few intervals of time in which the train travels at a speed high enough to cause the generator to operate fast enough to keep the storage battery charged sufficiently to provide the desired degree of lighting.

With this difficulty in mind it might appear that the solution of the problem is to be found in the utilization of the fluid under pressure normally stored in the brake pipe of the fluid pressure brake system of the train to drive a turbo-generator to provide lights and to charge the storage battery, but since the control of the brakes is dependent upon variations in the pressure of fluid in the brake pipe this use of fluid from the brake pipe would so impair the control of the brakes as to render the operation of a train dangerous.

It is therefore another object of the invention to provide means for controlling the supply of fluid under pressure from the brake pipe of the brake control system, to a turbo-generator, in such manner as to insure proper lighting and to eliminate the above mentioned difficulties.

Still another object of the invention is to provide a lighting system for caboose or cabin cars employing a turbo-generator operated by fluid under pressure from the brake pipe of the braking system, having a novel control arrangement whereby the consumption of fluid under pressure for operating the turbo-generator will have no detrimental effect upon the control of the brakes on a train.

Other objects and advantages will be apparent from the following more detailed description of the invention.

In the accompanying drawings Figs. 1A and 1B when taken together, represent, in diagrammatic form, a lighting system for caboose or cabin cars, embodying my invention.

Fig. 2 is a diagrammatic view showing a modification in the wiring diagram shown in Fig. 1B.

Figs. 3, 4, 5, 6 and 7 are diagrammatic views each illustrating a different modification of the means for controlling the flow of fluid from the brake pipe to the magnet valve device and thereby to the electric generator of the lighting system.

Description of the embodiment shown in Figs. 1A and 1B

As shown in Figs. 1A and 1B the apparatus may comprise a brake controlling valve device 1, a brake pipe 2, an auxiliary reservoir 3, an emergency reservoir 4, a brake cylinder 5, a magnet valve device 6, a turbo-generator 7, a bank of lamps 8, which may be disposed about the caboose in any desired manner, an electrical reverse current relay 9, an electrical relay 10, an electrical load current relay 11 and a storage battery 12.

The brake controlling valve device 1 comprises a pipe bracket 15, an emergency valve portion 16 mounted on one face of the pipe bracket which is adapted to be controlled by variations in pressure in the brake pipe 2, a filling piece 17 mounted on the opposite face of said bracket and a service application valve portion 18 mounted on said filling piece and also adapted to be controlled by variations in pressure in the brake pipe 2. This brake controlling valve device may be similar to that disclosed in Clyde C. Farmer Patent 2,031,213 issued February 18, 1936, and since this device is well known by those skilled in the fluid pressure brake art the description thereof will be limited to only those parts which are required to bring out clearly the present invention.

The service application valve portion comprises a casing having a piston chamber 19 which is connected to the brake pipe 2 by way of a passage 20 in the filling piece 17, a chamber 21 in the pipe bracket and a passage and pipe 22. Contained in piston chamber 19 is a piston 23 having a stem 24 adapted to actuate a main slide valve 25 and an auxiliary slide valve 26 contained in a valve chamber 27 which is connected to the auxiliary reservoir 3 by way of a passage and pipe 28.

As shown in Fig. 1A of the drawings, both the main slide valve 25 and the auxiliary slide valve 26 are in their normal or release position. With these slide valves thus positioned the auxiliary slide valve 26 uncovers a port 29 in the slide valve 25 which is in registration with a passage 30 provided in the seat for the main slide valve. This passage leads to the emergency valve portion 16 and is also connected by way of a passage and pipe 31 to the emergency reservoir 4.

The main slide valve 25 is provided with a cavity 33 which is adapted, in the release position of the slide valve, to connect a passage 34 with a passage 35 leading to the atmosphere for a reason hereinafter described. This slide valve is also provided with a through port 36 which, as shown, in release position of the slide valve is in registration with a passage 37 which leads to the usual release insuring mechanisms 38 for a reason fully described in the aforementioned patent. The passage 37 is in constant open communication with a passage 39 which is connected by way of a pipe 40 to the magnet valve device 6 shown in Fig. 1B of the drawings.

The valve mechanism contained in the emergency valve portion 16 of the control valve device 1 may be identical with that shown in the aforementioned patent, and since it has no particular bearing on the present invention it is deemed unnecessary to show and describe the mechanism in detail. However, a chamber 41 connected by way of a passage 42 to the passage 34 and containing the inshot valve mechanism 43 is shown, in order to illustrate the connection between chamber 41 and the usual brake cylinder passage 44 which is connected to a pipe 45 leading to the brake cylinder 5.

The magnet valve device 6 may be of the usual type and may be briefly described as comprising a single valve 50 of the poppet type which is biased to its seated position by a coil spring 51 and actuated to an unseated position in response to energization of the electromagnet or magnet winding 52. In its unseated position, the valve 50 establishes communication between the pipe 40 and a pipe 53 leading from the magnet valve device to the turbo-generator 7 and in its seated position closes this communication.

The pipe 40 is also connected to the pipe 53 by means of a pipe 55 having interposed therein a cut-out cock 48 which is operative in one position to permit fluid under pressure to by-pass the magnet valve device 6, as will hereinafter be fully described.

The turbo-generator 7 is constructed and arranged to be driven by fluid under pressure supplied through the pipe 53 and is adapted when operated to supply a direct-current voltage to the storage battery 12 for maintaining said battery charged with electrical energy in a manner hereinafter described.

The electrical load current relay 11 has an operating winding and a single front-contact member 56 which is biased to its open position when the relay winding is deenergized and which is actuated to picked-up or closed position when the operating winding of the relay is energized.

The opposite terminals of the storage battery 12 are connected to two wires or conductors 57 and 58, respectively. It will be assumed that the wire or conductor 57 is connected to the positive terminal of the battery and this wire or conductor will therefore hereinafter be referred to as the positive battery wire. The wire or conductor 58 is assumed to be connected to the negative terminal of the battery and will therefore hereinafter be referred to as the negative battery wire.

The positive battery wire 57 is connected to one terminal of the bank of lamps 8, while the opposite terminal of the bank of lamps is connected by a wire 59 to one terminal of a manually operative switch device 60. The other terminal of said switch device is connected by means of a wire 49 to one terminal of the operating winding of the load current relay 11 and the other terminal of the operating winding is connected to the negative battery wire 58.

The electric circuit, from the storage battery 12, for controlling the operation of the magnet valve device 6 is controlled by operation of the load current relay 11. One end of the electromagnet or magnet coil 52 is connected to the positive battery wire 57, the other end of the coil or winding is connected to the negative battery wire 58, this latter connection being made by way of a wire 61, contact member 56 of relay 11 and wires 62 and 63.

The relay 10 has an operating winding and a single front-contact member 64 which is biased to its open position when the winding of the relay is deenergized and which is actuated to picked-up or closed position when the winding is energized.

The reverse current relay 9 has an operating winding and a single front-contact member 65 which is biased to its open position when the relay winding is deenergized and which is actuated to picked-up or closed position when the winding is energized. This relay is of the unidirectional responsive type, that is, responsive only to a current flowing in one certain direction.

The left-hand and right-hand brush terminals of the generator 7 are connected to wires 67 and 68, respectively. The wire 68 is connected at its opposite end to the positive battery wire 57 and is also connected to one end of a wire 69. The wire 69 is connected at its opposite end to one terminal of the operating coil of the reverse current relay 9, the other terminal of this coil being connected to the wire 67.

The wire 69 is connected by a branch wire 70 to one terminal of the operating winding of the relay 10, the other terminal of the winding being connected by way of a wire 71 to the contact member 65 of the reverse current relay 9, which contact member in its circuit closing position connects the wire 71 to the wire 72 connected to the wire 67.

The wire 67 is also adapted to be connected to the battery negative wire 58 by means of wire 72, contact member 64 of the relay 10 and wires 62 and 63.

*Operation of the embodiment shown in Figs. 1A and 1B*

When a caboose or cabin car equipped with the electric lighting system just described, is connected in a train, fluid under pressure is supplied to the brake pipe 2 in the usual and well known manner. From the brake pipe, fluid under pressure flows through pipe and passage 22 to the chamber 17 in the pipe bracket 15 of the brake control valve device 1, from whence it flows by way of passage 20 in the filling piece to the piston chamber 19 in the service application valve portion 18. Fluid under pressure supplied to chamber 17 also flows to emergency valve portion 16 by way of a passage 75 in the usual well known manner.

With the piston 23 in release position, as shown in Fig. 1A of the drawings, fluid under pressure flows from the piston chamber 19 through feed grooves 81 and 82 to the slide valve chamber 27, and from there flows through passage and pipe 28 to the auxiliary reservoir 3. From the chamber 27 fluid under pressure flows to the emergency reservoir 4 by way of port 29 in the main slide valve 25, passage 30 and passage and pipe 31.

Fluid under pressure also flows from chamber 27 by way of port 36 in the main slide valve 25 to the passage 37 from whence it flows to a chamber 84 in the magnet valve device 6 by way of passage 39 and pipe 40.

With the slide valve 25 in release position, the brake cylinder 5 is open to the atmosphere by way of pipe 45, passage 44, a passage 85 in the brake cylinder build up control valve device 43, chamber 41, passages 42 and 34, cavity 33 in the slide valve 25 and passage 35.

From the foregoing description of the charging of the equipment it will be seen that the brakes are released and that the equipment is fully charged to its normal pressure with fluid.

When it is desired to illuminate the caboose or cabin car the manually operated switch device 60 is moved from the position in which it is shown to its circuit closing position. With the switch device in this position, a circuit is completed for lighting the light bulbs 8, said circuit including positive battery wire 57, the light bulbs 8, wire 59, manual contact switch 60, wire 48, the operating winding of the load current relay 11 and negative battery wire 58.

It will be understood that just as soon as the manual contact switch 60 is moved to its circuit closing position and the circuit just traced completed, the operating winding of the relay 11 will be energized, thus causing the contact member 56 to be picked-up or closed.

With the contact member 56 in its closed position the electromagnet or magnet winding 52 of the magnet valve device 6 will be energized. The circuit for energizing the magnet winding 52 including the positive battery wire 57, winding 52, wire 61, contact member 56 of the relay 11, connected wires 62 and 63 and negative battery wire 58.

Upon energization of the magnet winding 52, the magnet valve 50 will be actuated to its unseated position. With the valve 50 unseated fluid under pressure in pipe 40 flows to the turbo-generator 7, by way of a choke 85 in pipe 40, magnet valve chamber 84, past unseated valve 50 and pipe 53.

It will be understood that fluid under pressure thus supplied to the turbo-generator 7 will cause it to operate to supply current across the brush terminals. Now assuming that the right-hand brush terminal is positive and that the left-hand brush terminal is negative, the current thus supplied by the generator flows from the positive brush terminal by way of wires 68 and 69, through the operating winding of the reverse current relay 9 and wire 67 to the negative brush terminal, thus energizing the operating winding of the relay 9 to thereby cause the contact member 65 to be picked-up or closed.

With the contact 65 picked-up or closed another circuit is completed from the positive brush terminal to the negative brush terminal of the generator. This circuit including wires 68, 69, and 70, operating winding of the relay 10, wire 71, contact member 65 of the relay 9 and wires 72 and 67. With this circuit completed the operating winding of the relay 10 will be energized thus causing the contact member 64 to be picked-up or closed.

When the contact member 64 of the battery contactor 10 is thus closed, the circuit will be completed for maintaining the storage battery 12 charged with electrical energy. This circuit includes the positive brush terminal of the generator, wires 68 and 57, battery 12, wires 58, 63 and 62, contact member 64 of the relay 10, wires 72 and 67 and negative brush terminal of the generator.

From the foregoing description it will be understood that when the brake controlling valve device 1 is in its release position and the equipment is charged with fluid under pressure, the generator will operate to supply electrical energy to the battery as long as the light bulbs 8 in the car are lighted.

If it is desired to turn the lights in the car off the manual switch 60 is moved to its contact open position in which it is shown in Fig. 1B of the drawings. With the switch thus positioned, the circuit from the positive battery wire 57 through the light bulbs 8 to the negative battery wire 58 is opened thus causing the lights to be extinguished and the winding of the relay valve device 11 to become deenergized.

Upon deenergization of the winding of the relay 11, the contact member 56 moves to its open position to open the circuit through the magnet winding 52 of magnet valve device 6, thus causing the winding 52 to be deenergized. When the winding 52 is deenergized the spring 51 will operate to move the valve 50 to its seated position as shown in the drawings.

With the magnet valve 50 seated, communication between pipe 40 and pipe 53 will be cut off so that the flow of fluid under pressure from the pipe 40 to turbo-generator 7 is cut-off and the generator comes to a stop. When this occurs the supply of current from the generator to the relay 9 is cut-off, thus deenergizing the winding thereof and as a consequence of such deenergization the contact member 65 will move to its circuit opening position.

With the contact member 65 of the relay 9 in its circuit open position the circuit through the brush terminals of the generator and the winding of the relay 10 is opened, thus causing the winding of the relay to be deenergized. Upon deenergization of this winding, the contact member 64 will move to its circuit opening position, thereby opening the circuit across the brush terminals of the generator and storage battery 12.

When the generator is slowed down or stopped the flow of current to the winding of the relay 9 will be reversed that is, current will then flow from the battery 12 by way of positive battery wire 57, wire 66, through the armature of the generator 7 and wire 67 to the relay. However, as before mentioned this relay is of the unidirectional responsive type, so that the current flow in this direction to the operating winding of the relay will not effect movement of the contact member 65 from its circuit open position. Since the contact member 65 is maintained open at this time, the operating winding of the relay 10 will be maintained deenergized, thus maintaining the contact member 64 in its circuit open position so that there can be no discharge of electrical energy from the storage battery through the generator 7 when the generator is idle.

It will be understood that the cock 48 will normally be maintained in the position for cutting off the flow of fluid under pressure from the pipe 40 to the pipe 53, so that the control of the flow of fluid under pressure from the pipe 40 to the turbo-generator is normally under the control of the magnet valve device 6. However, it will be understood that if desired, as may be the case in the event that the battery is not charged sufficiently to effect the operation of the magnet valve device 6 to unseat valve 50, the cock may be moved to its open position to permit fluid under pressure to flow from the pipe 40 to the turbo-generator, the valve 50 having no control whatever over such flow.

From the foregoing description it will be apparent that so long as the brake control valve device 1 is maintained in release position fluid under pressure will be supplied to the pipe 40 and that when the lighting circuits is closed the valve 50 will be unseated and as a result fluid under pressure will flow from the pipe 40 to the turbo-generator by way of pipe 53, which flow will have no detrimental effect upon the fluid pressure brake system.

When a service or an emergency application of the brakes is initiated by effecting a reduction in brake pipe pressure in the usual manner the several parts of the application valve portion are caused to move from the position in which they are shown in Fig. 1A of the drawings to their application position.

With the main slide valve 25 and auxiliary slide valve 26 in their respective application positions, fluid under pressure flows from the auxiliary reservoir 3 to the brake cylinder 5 to effect an application of the brakes. The flow of fluid under pressure from the auxiliary reservoir to the brake cylinder is made by way of pipe and passage 28, valve chamber 27, a port 87 in the main slide valve 25, passages 34 and 42, chamber 41, passage 85 in the inshot valve mechanism 43, passage 44 and pipe 45.

With the main slide valve 25 in application position the cavity 33 therein connects passage 37 to the passage 35 leading to the atmosphere, thus venting fluid under pressure from the chamber 84 of the magnet valve device 6 by way of pipe 40, passage 39, passage 37, cavity 33 in the slide valve 25 and passage 35.

Under these conditions the lighting system is isolated from the brake system and cannot in any manner affect the operation of the brake system.

*Description of embodiment shown in Fig. 2*

In Fig. 2 there is shown a fragment of the equipment shown in Figs. 1A and 1B in which certain modifications are made in the wiring diagram shown in Fig. 1B. For simplicity, corresponding parts and wires of the two embodiments will be designated by the same reference numerals without further description and only those parts provided in Fig. 2 which are not provided in the previous embodiment will be described briefly in connection with the basic parts of the equipment.

The modification resides in the addition of a voltage responsive relay 90 which is employed to control the operation of the load current relay in such a manner that the generator will not operate to charge the storage battery, unless the battery voltage falls below a predetermined value, regardless of the load on the battery.

The voltage relay 90 is provided with an operating winding and a front contact member 91 and a back contact member 92. It will be understood that, as employed herein a front contact is one which is in open position when the relay is dropped out and which is actuated to a closed position when the relay is picked-up, whereas a back contact is one which is in closed position when the relay is dropped-out and is actuated to open position when the relay is picked-up.

The winding of this relay is so designed as to cause pick-up of the relay contact members 91 and 92 so long as the battery voltage does not drop below a predetermined value.

It will also be noted that in this embodiment of the invention the load current relay 11 is provided with a back contact member 56a, which is substituted for the front contact member 56 in Fig. 1B.

As shown, one terminal of the winding of the voltage relay 90 is connected to the wire 68 by means of a wire 93 and the opposite terminal is connected to the battery negative wire 58 through the medium of a wire 94, a manually operative switch 95 and contact member 56a of the load current relay 11.

The contact member 91 of the voltage relay 90 is connected to one end of a wire 96 which at its opposite end is connected to the wire 61 and, in this embodiment of the invention the wire 61 extends from one terminal of the magnet winding 52 to one terminal of the winding of the load relay 11 and is also connected to the negative battery wire 58 by means of a wire 97. The contact member 91 in its picked-up position engages a stationary contact member that is connected by means of a wire 98 to the other terminal of the operating winding of the relay 11, which wire in turn is connected to the wire 59. It will be understood that the contact member 91, in its picked-up or closed position, will establish a shunt connection around the winding of the load relay 11, the reason for this will be explained later.

The contact 92 of the voltage relay 90 is connected to one end of a wire 99 which wire at its opposite end is connected to the other terminal of the magnet winding 52 of the magnet valve device 6. This contact in dropped-out position engages a stationary contact that is connected by a wire 100 to the wire 69.

*Operation of the embodiment shown in Fig. 2*

The operation of the apparatus shown in Fig. 2 is, with the exception of the operation of the voltage relay and its control, identical to that of the embodiment illustrated in Figs. 1A and 1B and in view of this it is deemed unnecessary to repeat a full description of the operation which are obviously common to both embodiments. The operation of this embodiment will therefore be restricted to the operation of the voltage relay and such parts associated therewith as is necessary to a clear understanding of the invention.

Let it be assumed that the battery voltage has dropped below that which is required to cause the operating winding of the voltage responsive relay 90 to actuate the contacts 91 and 92 to their picked-up position, the contacts 91 and 92 will assume the position in which they are shown in Fig. 2 of the drawings.

With the contact 91 in this position the shunt connection around the winding of the load relay 11 is open while the contact 92 connects the wires 99 and 100. Under these conditions when the manually operated switch 60 is moved to its circuit closing position, a circuit from the positive battery wire 57 to the negative battery wire 58 is completed, the circuit including the light bulbs 8, wire 59, manual operative switch 60, winding of the load relay 11 and wires 61 and 97, thus causing the bulbs 8 to be lighted.

Just as soon as the bulbs 8 are lighted, a load is imposed on the winding of the load relay 11 thus causing the contact member 56a thereof to be moved to its picked-up position in which the circuit from the positive wire 57 to the negative wire 58 of the storage battery and including the winding of the voltage responsive relay 90 is opened. Opening of this circuit insures that the contact members 91 and 92 of the voltage responsive relay 90 will remain in the position in which they are shown as long as the lamps are lighted. When this occurs another circuit from the positive battery wire 57 to the negative battery wire 58 is completed including wires 68, 69, and 100, back contact 92 of the voltage relay 90, wire 99, winding 52 of the magnet 6, wire 61 and connected wire 97. With this circuit completed the magnet winding 52 is energized thereby causing the magnet valve device to operate as hereinbefore described in connection with the embodiment illustrated in Figs. 1A and 1B to supply fluid under pressure from the pipe 40 to the turbo-generator 7. Upon such supply of fluid under pressure the turbo-generator will operate in identically the same manner as previously described to charge the battery 12 with electrical energy as long as the lamps are lighted or, in other words, as long as a load is imposed on winding of the load current relay 11.

If the battery voltage is above the predetermined value required to energize the operating winding of the voltage relay 90, said winding will be energized through a circuit including the positive battery wire 57, wires 68 and 93, operating winding of the relay 90, wire 94, manual switch 95, back contact member 56a of the load relay 11 and negative battery wire 58. With the winding of the voltage responsive relay 90 energized the contacts 91 and 92 will be actuated from the position in which they are shown to their upper positions.

With the front contact 91 in its upper position the wires 96 and 98 are connected together and with the back contact 92 in its upper position the wires 99 and 100 are disconnected.

Under these conditions when the manual switch 60 is moved to its circuit closing position to complete the lighting circuit for the light bulbs 8, the circuit including the bulbs 8, wire 57, manual switch 60, wire 98, contact 91 of the voltage responsive relay 90, wire 95 and wires 61 and 97, thus shunting the winding of the load current relay 11. With the winding of the load current relay thus shunted, the back contact member 56a of the load current relay is maintained in the position shown, thus maintaining the circuit through the positive battery wire 57, the negative battery wire 58 and the winding of the voltage responsive relay closed, as long as the battery voltage remains above a predetermined value.

Since the winding of the voltage relay 90 is maintained energized, the back contact 92 is maintained in its upper position, thus the circuit through the positive battery wire 57, the negative battery wire 58 and the magnet winding 52 is maintained open, so that the magnet winding 52 is maintained deenergized.

From the foregoing it will be seen that when this embodiment of the invention is employed the generator 7 will not operate to charge the battery so long as the battery voltage is above a predetermined value. However, it will be noted that if this battery voltage does drop below the predetermined value required to maintain the voltage responsive relay energized, the generator will continue to operate to charge the battery until the light in the caboose or cabin car is extinguished.

It should here be mentioned that the manual switch device 95 is interposed in the wire 94 for the purpose of rendering the voltage responsive relay 90 either operative or inoperative and is maintained in its contact closing position when it is desired to render the relay operative and moved to its circuit open position when it is desired to render the relay inoperative.

*Embodiment shown in Fig. 3*

In Fig. 3 there is shown a fragment of the control equipment shown in Fig. 1A. The control equipment in this embodiment of the invention is identical to that shown in Fig. 1A, except that a uni-flow check valve device 110 and a volume reservoir 111 have been interposed in the pipe 40 between the control valve device 1 and the magnet valve device 6, the check valve 110 being operative to prevent back flow of fluid under pressure from the reservoir 111 to the control valve device 1.

It will be understood that with the control valve device in release position fluid under pressure supplied to pipe 40, as hereinbefore described in connection with Fig. 1A, flows past check valve 111 to charge the reservoir 110. Now when the control valve device is moved to service position the pressure of fluid in pipe 40 between the check valve 111 and the control valve device 1 is vented to the atmosphere, the check valve maintains the reservoir and the portion of pipe 40 between the reservoir and the magnet valve device charged.

If the magnet winding 52 of the magnet valve device 6 is energized at the time the control valve device is moved to service position or at a time during the period the control valve device is in service position, it will be apparent that the supply of fluid under pressure maintained in the reservoir 110, when the control valve device 1 is moved to service position, will be sufficient to cause the turbo-generator to operate for a period of time after the control valve device has been moved to service position.

*Embodiment shown in Fig. 4*

In Fig. 4 there is shown a fragment of a different form of control means which may be substituted for the control means shown in either Figs. 1A or 3. In this embodiment of the invention a cut off valve device 112 is employed for controlling the supply of fluid under pressure from the brake pipe 2 to the reservoir 110. The cut off valve casing preferably comprises a body section 113, a center section 114 and a cap section 115, the body section 113 and the cap section 115 being respectively secured to opposite sides of the center section 114. Clamped between the center section 114 and the cap section 115 is a flexible diaphragm 116. At one side of this diaphragm there is a chamber 117 which is in constant open communication with a portion of the pipe 40 leading from the control valve device 1.

Clamped between the center section 114 and the body section 113 is a flexible diaphragm 118. At one side of this diaphragm there is a chamber 119 which is in constant open communication with the other portion of a pipe 40 leading to the reservoir 110. The diaphragms 116 and 118 together with the casing form a chamber 120 which is connected to the atmosphere by way of a passage 121. The body section 114 is also provided with a chamber 122 which is in constant open communication with a pipe 123 leading to the brake pipe 2. The chamber 122 is also connected to the chamber 119 by a port 124 which port is controlled by a valve 125 disposed in chamber 122, having a stem 126, the outer end of which extends into chamber 119.

Contained in chamber 122 and interposed between and operatively engaging the valve 125 and the casing is a spring 127 which tends at all times to urge the valve 125 to its seated position as shown in Fig. 4 of the drawings.

Contained in chamber 120 and abutting one face of the diaphragms 116 and 118, respectively, is a diaphragm follower 128. Contained in chamber 119 and abutting the opposite face of the diaphragm 118 is a diaphragm follower 129 which is connected to the follower 128 in any suitable manner. The follower 128 is provided with a stem 130 which is adapted to engage the outer end of the valve stem 126 and unseat the valve 125 when the diaphragms 116 and 118 are flexed in an upward direction upon the supply of fluid under pressure to the chamber 117.

With the control valve device in release position, fluid under pressure flows to that portion of the pipe 40 that extends from the control valve device 1 to the cut-off valve device 113 and as a consequence flows to chamber 117, thus causing the diaphragms 116 and 118 to flex in an upwardly direction. This upward flexing of the diaphragms 116 and 118 causes the diaphragm followers 128 and 129 to move in the same direction, first moving the follower stem 130 into engagement with the valve stem 126 and then moving the valve 125 out of seating engagement with its seat against the opposing pressure of the spring 127.

With the valve 125 unseated fluid under pressure flows from the brake pipe 2 to the reservoir 110 by way of pipe 123, chamber 122, past unseated valve 125, chamber 119, and through check valve 111 disposed in that portion of pipe 40 that extends from the cut off valve device to the reservoir 110, thus charging the reservoir to the pressure carried in the brake pipe.

As will be understood from the description of the apparatus illustrated in Fig. 1A, movement of the control valve device 1 to service position will cause fluid under pressure in chamber 117 to be vented by way of that portion of pipe 40 which extends from the cut off valve 112 to the control valve device 1 and through said control valve device to the atmosphere. When this occurs, the pressure of fluid in chamber 119 and acting on the diaphragm 118 causes the diaphragms 118 and 116 to flex downwardly thus moving the diaphragm stem 130 out of engagement with the end of the valve stem 126, so that the spring 127 is permitted to act to seat the valve 125. With the valve 125 seated, further flow of fluid under pressure from the brake pipe ito the reservoir is cut off, thus isolating the illuminating system from the brake system. Since this embodiment employs a reservoir 110 and a check valve 111, the same as just described in connection the embodiment shown in Fig. 3, it will be understood that the generator 7 will operate for a period of time after the control valve device has been moved to service position.

*Embodiment shown in Fig. 5*

In Fig. 5 there is shown a fragment of still a different form of control means which may be substituted for the control means shown in either Figs. 1A, 2, 3, or 4. In this embodiment of the invention a control valve device 201 which may be identical in construction and operation to that shown, described and claimed in Patent 2,031,213 issued on February 18, 1936, is shown. This device differs from the corresponding device shown in Fig. 1A in that the filling piece 17 and the means for controlling the supply of fluid under pressure to the passage in such filling piece by the service portion of the device are omitted.

In this embodiment of the invention a cut-off valve 140 is provided which comprises a casing having a chamber 141 to which the pipe 40 leading to the magnet valve device 6 is connected and also having a chamber 142 to which the pipe 123 leading to the brake pipe 2 is connected. The chambers 141 and 142 are connected by a port 144 which is controlled by a diaphragm valve 145. Due to its inherent resiliency, the diaphragm valve 145 is normally unseated and establishes communication between the chambers 141 and 142.

The diaphragm valve 145 is operated by a diaphragm 143 which is effective when subject to the pressure of fluid in a chamber 146 at one side thereof to shift the diaphragm valve 145, through the medium of suitable followers, into seated engagement on its associated seat to close the connection between the chambers 141 and 142.

Also formed in the casing of the cut-off valve device 140 is a chamber 148 to which a pipe 149 leading from the brake cylinder 5 is connected. A spring loaded valve piston 150 controls communication between chamber 148 and the chamber 146 through a port 151 to prevent the supply of fluid under pressure from the pipe 149 to the chamber 146 until the pressure in the chamber 148 and acting to unseat the valve piston 150 exceeds a certain uniform pressure. When the spring loaded valve piston 150 is seated on its associated valve seat, it establishes communication between the chamber 146 and the atmosphere through a passage and port 152. When the pressure of fluid supplied to the chamber 148 exceeds a certain uniform pressure sufficient to overcome the leading spring of the valve piston 150, the valve piston 150 is unseated and being suddenly subjected to fluid under pressure over an increased area is snapped suddenly upward into seated engagement on an annular gasket seat 153 to cut off the connection from the chamber 146 to atmosphere through the exhaust passage and port 152, while at the same time establishing communication from the pipe 149 and chamber 148 to the chamber 146.

With the control valve device 201 in its release position the brake cylinder 5 and connected chamber 148 of the cut off valve device 140 is connected to the atmosphere by way of pipe 45 and through the control valve device 201 in the usual well known manner. Under these conditions the associated parts of the cut-off valve device 140 will be positioned as shown in Fig. 5 of the drawings.

With the parts of the cut-off valve device 140 thus positioned, fluid under pressure flows from the brake pipe 2 to the magnet valve device 6, by way of pipe 123, chamber 142 in the cut-off valve device 140, port 144, past unseated valve 145, chamber 147 and pipe 40, thus providing the fluid under pressure required to operate the generator 7 upon energization of the magnet valve device 6.

Now when an application of the brakes is initiated fluid under pressure is supplied to the brake cylinder 5 in the usual well known manner and as a consequence flows by way of pipe 149 to the chamber 148 in the cut-off valve device 140. When the pressure of fluid in chamber 148 has been increased to a degree sufficient to overcome the opposing force of the spring acting to maintain the valve 150 seated, the valve is moved to its unseated position to establish communication between chamber 148 and 146. With this communication established fluid under pressure in chamber 148 flows by way of port 15, past unseated valve 150 to chamber 146. Fluid under pressure thus supplied to chamber 146 and acting on diaphragm 143 acts through the followers to shift the diaphragm valve 145 into seating engagement with its seat to close the connection between chambers 142 and 147. With this connection closed further flow of fluid under pressure from the brake pipe 2 to the pipe 40 is cut-off thereby isolating the brake system from the illuminating system.

It will be understood that in effecting an application of the brakes fluid under pressure in the brake cylinder 5 and connected chamber 148 of the cut-off valve device 140 is vented to the atmosphere, thus causing the cut-off valve device to assume the position in which it is shown to again reestablish communication between the brake pipe 2 and the magnet valve device 6 as already described.

*Embodiments shown in Figs. 6 and 7*

The embodiment shown in Fig. 6 is similar to that shown in Fig. 5, but differs therefrom in that the chamber 142 of the cut-off valve device is connected by way of a pipe 160 to the emergency reservoir 4 instead of being connected to the brake pipe 2. It will therefore be apparent that the only difference between the embodiments shown in Figs. 5 and 6 is that in the embodiment illustrated in Fig. 5 the fluid pressure supply for effecting the operation of the generator is taken directly from the brake pipe while in the embodiment illustrated in Fig. 6 it is taken from the emergency reservoir.

The embodiment shown in Fig. 7 is similar to that shown in Fig. 6 but differs therefrom in that a check valve 111 and a reservoir 110 is interposed in the pipe 40 for the reason previously described in connection with the apparatus of Figs. 3 and 4.

Having now described our invention, what we claim as new and desire to secure by Letters Patent, is:

1. In a vehicle having a fluid pressure brake system and an electric distribution system, in combination, a load circuit included in said electric distribution system, a storage battery included in said circuit, an electric generator for supplying current to said circuit, fluid pressure operated means for driving said generator, a source of fluid under pressure included in said fluid pressure brake system, means controlled by the current in said load circuit for supplying fluid under pressure from said source to said fluid pressure operated means to drive said generator, and means for regulating the rate of flow of fluid from said source to the fluid pressure operated means.

2. In a vehicle having a fluid pressure brake system and an electric distribution system, comprising in combination, a load circuit included in said electric distributing system, a storage battery included in said circuit, switch means operative for opening and closing said circuit, an electric generator for supplying current to said circuit, fluid pressure operated means for driving said generator, a source of fluid under pressure included in said fluid pressure brake system, electroresponsive means operative when energized to supply fluid from said source of fluid under pressure to said fluid pressure operated means to drive said generator, a brake controlling valve device included in said fluid pressure brake system having a brake application position and a brake release position, said brake controlling valve device in its brake release position establishing communication through which fluid flows from said source to said electroresponsive means, and means responsive to the current in said circuit when the circuit is closed for effecting energization of said electro-responsive means.

3. In a vehicle having a fluid pressure control system and an electric distribution system, comprising in combination, a load circuit included in said electric distributing system, a storage battery included in said circuit, switch means operative for opening and closing said circuit, an electric generator for supplying current to said circuit, fluid pressure operated means for driving said generator, a source of fluid under pressure included in said fluid pressure control system, a control valve device included in said fluid pressure control system and having two different control positions, electro-responsive means operative when energized to supply fluid from said source of fluid under pressure to said fluid pressure operated means to drive said generator, said control valve device in one of its control positions establishing communication through which fluid is supplied from said source to said electroresponsive means, and an electric current responsive relay operative for effecting energization of said electro-responsive means.

4. In a vehicle having a fluid pressure control system and an electric distribution system, in combination, a load circuit including a storage battery comprising a part of said electric distribution system, an electric generator for supplying current to said circuit, fluid pressure responsive means for driving said generator, a source of fluid under pressure included in said fluid pressure control system, means including an electric relay responsive to the current in said load circuit for supplying fluid under pressure from said source to said fluid pressure responsive means to drive the generator, and means for controlling the rate of flow of fluid from said source to said fluid pressure responsive means for preventing undesired action of said fluid pressure control system.

5. In a vehicle having a fluid pressure brake system and an electric distribution system, in combination, a load circuit including a storage battery comprising a part of said electric distributing system, a fluid pressure driven electric generator for supplying current to said battery, current responsive means controlled by the current in said load circuit for supplying fluid from said fluid pressure brake system to effect the operation of said generator, a brake controlling valve device included in said fluid pressure brake system and having a brake application position and a brake release position, said brake controlling valve device in its brake release position establishing a communication through which fluid flows to said current responsive means, and means responsive to the storage battery voltage for controlling said current responsive means and operative when the storage battery voltage is above a predetermined degree for rendering said current responsive means inoperative.

6. In a vehicle having a fluid pressure control system and an electric distribution system, in combination, a load circuit including a storage battery, a fluid driven electric generator for supplying current to said battery, electro-responsive means operative when energized to supply fluid from said fluid pressure control system to drive said generator, means responsive to the storage battery voltage only upon a drop in the voltage below a predetermined degree for effecting energization of said electro-responsive means, and means for regulating the flow of fluid from the control system to insure that the system will not be undesirably affected by the use of fluid pressure therefrom.

7. In a vehicle having a fluid pressure control system including a control pipe normally charged with fluid under pressure and an electric distribution system, in combination, a load circuit including a storage battery comprising a part of said distributing system, an electric generator for supplying current to said battery, a fluid pressure motor operative upon a supply of fluid under pressure thereto for driving said generator, electro-responsive means operative when energized to supply fluid under pressure from said control pipe for driving said motor, means responsive to the current in the load circuit for effecting energization of said electro-responsive means, voltage responsive means for rendering said means either effective or ineffective and operative only upon a drop in storage battery voltage below a predetermined degree for rendering said means effective, and a choke for regulating the rate of flow of fluid from said control pipe to said fluid pressure motor for insuring that the fluid pressure control system will not be indesirably affected by use of fluid from said control pipe.

8. In a vehicle having a fluid pressure brake system normally charged with fluid under pressure, in combination, an electric lighting system comprising a lighting circuit having a storage battery, an electric generator for supplying current to said battery, fluid pressure operated means for driving said generator, and means controlled by the current in said lighting circuit for supplying fluid under pressure from the brake system to said fluid pressure operated means only when the brakes of the vehicle are released to drive said generator.

9. In a vehicle having a fluid pressure brake system normally charged with fluid under pressure, in combination, an electric distributing system comprising a load circuit including a storage battery, an electric generator for supplying current to said battery, a motor operated by fluid under pressure supplied thereto for driving said generator, means controlled by the current in said load circuit for supplying fluid under pressure from the brake system to said motor, and voltage responsive means operative only upon a drop in battery voltage below a predetermined degree for effecting operation of said means to supply fluid under pressure to said motor.

10. In a vehicle having a fluid pressure brake system normally charged with fluid under pressure, in combination, an electric lighting system comprising a lighting circuit including a storage battery, an electric generator for supplying current to said battery, motor means operated by fluid under pressure for driving said generator, a magnet valve device operative when energized to supply fluid under pressure from the brake system to said motor means for driving said generator, and means controlled by the current in the lighting circuit operative for effecting energization of said magnet valve device.

11. In a vehicle having a fluid pressure distributing system normally charged with fluid under pressure, in combination, a controlling valve device having a control position for supplying fluid under pressure for one purpose and having another control position for supplying fluid under pressure for another purpose, said valve device being movable from either one of said positions to the other in response to variations in a control fluid pressure, an electric lighting circuit including a storage battery, an electric generator for supplying current to said battery, means operative by fluid under pressure for driving said generator, and means controlled by the current in said circuit for admitting fluid under pressure supplied by said controlling valve device to said fluid pressure operated means only when said controlling valve device is in its said other control position.

12. In a vehicle having a fluid pressure distributing system normally charged with fluid under pressure, in combination, a controlling valve device having a control position for supplying fluid under pressure for one purpose and having another control position for supplying fluid under pressure for another purpose, said valve device being movable from either one of said positions to the other in response to variations in a control fluid pressure, an electric lighting circuit including a storage battery, an electric generator for supplying current to said battery, means operative by fluid under pressure for driving said generator, electro-responsive means operative only when energized for admitting fluid under pressure supplied by said controlling valve device to said fluid pressure operated means only when said controlling valve device is in its said other control position, and means controlled by the current in said circuit operative to effect energization of said electro-responsive means.

13. In a vehicle having a fluid pressure distributing system normally charged with fluid under pressure, in combination, a controlling valve device having a control position for supplying fluid under pressure for one purpose and having another control position for supplying fluid under pressure for another purpose, said valve device being movable from either one of said positions to the other in response to variations in a control fluid pressure, an electric lighting circuit including a storage battery, an electric generator for supplying current to said battery, means operative by fluid under pressure for driving said generator, electro-responsive means operative only when energized for admitting fluid under pressure supplied by said controlling valve device to said fluid pressure operated means only when said controlling valve device is in its said other control position, and means controlled by the current in said circuit and operative to effect energization of said electro-responsive means, and operative upon a decrease in the current in said circuit to effect deenergization of said electro-responsive means.

14. In a vehicle having a fluid pressure distributing system normally charged with fluid under pressure, in combination, a controlling valve device having a control position for supplying fluid under pressure for one purpose and having another control position for supplying fluid under pressure for another purpose, said valve device being movable from either one of said positions to the other in response to variations in a control fluid pressure, an electric lighting circuit including a storage battery, an electric generator for supplying current to said battery, means operative by fluid under pressure for driving said generator, means controlled by the current in said circuit for admitting fluid under pressure supplied by said controlling valve device to said fluid pressure operated means only when said controlling valve device is in its said other control position, and means for supplying fluid under pressure to said fluid pressure operated means after said controlling valve device has been moved to the first mentioned control position from said other control position.

15. In a vehicle having a fluid pressure distributing system normally charged with fluid under pressure, in combination, a controlling valve device having a control position for supplying fluid under pressure for one purpose and having another control position for supplying fluid under pressure for another purpose said valve device being movable from either one of said positions to the other in response to variations in a control fluid pressure, an electric lighting circuit including a storage battery, an electric generator for supplying current to said battery, means operative by fluid under pressure for driving said generator, means controlled by the current in said circuit for admitting fluid under pressure supplied by said controlling valve device to said fluid pressure operated means only when said controlling valve device is in its said other control position, and means for insuring the operation of said generator for an interval of time after said controlling valve device has been moved to the first mentioned control position from said other control position.

16. In a vehicle having a fluid pressure distributing system normally charged with fluid under pressure, in combination, a controlling valve device having a control position for supplying fluid under pressure for one purpose and having another control position for supplying fluid under pressure for another purpose, said valve device being movable from either one of said positions to the other in response to variations in a control fluid pressure, an electric lighting circuit including a storage battery, an electric generator for supplying current to said battery, means operative by fluid under pressure for driving said generator, means controlled by the current in said circuit for admitting fluid under pressure supplied by said controlling valve device to said fluid pressure operated means only when said controlling valve device is in its said other control position, and a reservoir charged with fluid under pressure when said controlling valve device is in said other control position said reservoir being arranged to supply fluid under pressure to said fluid pressure operated means for an interval of time after said controlling valve device has been moved to the first mentioned control position from said other control position.

17. In a vehicle having an electric lighting system including a lighting circuit having a storage battery, in combination, an electric generator for charging said battery, a motor operative upon the supply of fluid under pressure thereto for driving said generator, a control pipe through which fluid under pressure is supplied to said motor, a fluid pressure responsive cut-off valve device interposed in said control pipe normally permitting the flow of fluid under pressure through said control pipe and operative upon an increase in a fluid pressure acting in opposition to the pressure of fluid in the control pipe for cutting off the supply of fluid under pressure through said control pipe, and means controlled by the current in said circuit for permitting fluid under pressure supplied to said control pipe to flow to said motor when said cut-off valve device is in its normal position.

18. In a vehicle having a fluid pressure distributing system including a communication through which fluid under pressure is adapted to flow, a control valve device having a control position for supplying fluid under pressure to said communication and another control position for supplying fluid under pressure to said communication and another control position for venting fluid under pressure from said communication, in combination, an electric lighting circuit including a storage battery, an electric generator for supplying current to said battery, fluid pressure operated means for driving said generator, a control pipe, a source of fluid under pressure, valve means responsive to the pressure of fluid in said communication operative when said control valve device is in said control position for permitting fluid under pressure to flow from said source to said control pipe and operative when said control valve device is in said other position for cutting off the supply of fluid under pressure from said source to said control pipe, and means responsive to the current in said circuit for permitting fluid under pressure to flow from said control pipe to said fluid pressure operated means when said control pipe is charged with fluid under pressure.

19. In a vehicle having a fluid pressure brake equipment comprising a control pipe normally charged with fluid under pressure and means operative to one position upon a reduction in control pipe pressure to effect an application of the brakes and operative to another position upon an increase in control pipe pressure for effecting a release of the brakes, in combination, an electric lighting circuit including a storage battery, an electric generator for supplying current to said battery, fluid pressure operated means for driving said generator, another control pipe through which fluid under pressure in the first mentioned control pipe may flow to said fluid pressure operated means, means controlled by the current in said circuit for permitting fluid under pressure supplied to said other control pipe to flow to said fluid pressure operated means, and means operative only when said first mentioned means is in said one position for supplying fluid under pressure to said other control pipe.

20. In a vehicle having a fluid pressure brake equipment comprising a control pipe normally charged with fluid under pressure and means operative to one position upon a reduction in control pipe pressure to effect an application of the brakes and operative to another position upon an increase in control pipe pressure for effecting a release of the brakes, in combination, an electric lighting circuit including a storage battery, an electric generator for supplying current to said battery, fluid pressure operated means driving said generator, another control pipe through which fluid under pressure in the first mentioned control pipe may flow to said fluid pressure operated means, means controlled by the current in said circuit for permitting fluid under pressure supplied to said other control pipe to flow to said fluid pressure operated means, and a cut-off valve device for controlling the flow of fluid under pressure from the first mentioned control pipe to said other control pipe, said cut-off valve device being operative when the first mentioned means is in said one position for cutting off said flow of fluid under pressure from the first mentioned control pipe to said other control pipe and being operative when said first mentioned means is in said other position for supplying fluid under pressure from said control pipe to said other control pipe.

21. In a vehicle having a fluid pressure brake equipment comprising a control pipe normally charged with fluid under pressure, a brake cylinder, and means operative upon a reduction in control pipe pressure for supplying fluid under pressure to said brake cylinder to effect an application of the brakes and operative upon an increase in control pipe pressure for releasing fluid under pressure from said brake cylinder to effect a release of the brakes, in combination, an electric lighting circuit including a storage battery, an electric generator for supplying current to said battery, fluid pressure operated means for driving said generator, another control pipe through which fluid under pressure from the first mentioned control pipe may flow to said fluid pressure operated means, a cut-off valve device operative in response to an increase in the pressure of fluid in said brake cylinder for cutting off the flow of fluid under pressure from the first mentioned control pipe to said other control pipe and operative in response to a decrease in pressure in said brake cylinder for permitting fluid under pressure to flow from the first mentioned control pipe to said other control pipe, and means operative only when the storage battery voltage is below a predetermined degree for admitting fluid under pressure from said other control pipe to said fluid pressure operated means even though said cut-off valve device is in said other position.

22. In a vehicle having a fluid pressure brake equipment comprising a control pipe normally charged with fluid under pressure, a brake cylinder, and means operative upon a reduction in control pipe pressure for supplying fluid under pressure to said brake cylinder to effect an application of the brakes and operative upon an increase in control pipe pressure for releasing fluid under pressure from said brake cylinder to effect a release of the brakes, in combination, an electric lighting circuit including a storage battery, an electric generator for supplying current to said battery, fluid pressure operated means for driving said generator, another control pipe through which fluid under pressure from the first mentioned control pipe may flow to said fluid pressure operated means, a cut-off valve device operative in response to an increase in the pressure of fluid in said brake cylinder for cutting off the flow of fluid under pressure from the first mentioned control pipe to said other control pipe and operative in response to a decrease in pressure in said brake cylinder for permitting fluid under pressure to flow from the first mentioned control pipe to said other control pipe, and means operatively responsive to the current in said lighting circuit for admitting fluid under pressure from said other control pipe to said fluid pressure operated means even though said cut-off valve device is in said other position.

23. In a vehicle having a fluid pressure brake equipment comprising a control pipe normally charged with fluid under pressure, a brake cylinder, and means operative upon a reduction in control pipe pressure for supplying fluid under pressure to said brake cylinder to effect an application of the brakes and operative upon an increase in control pipe pressure for releasing fluid under pressure from said brake cylinder to effect a release of the brakes, in combination, an electric lighting circuit including a storage battery, an electric generator for supplying current to said battery, fluid pressure operated means for driving said generator, another control pipe through which fluid under pressure from the first mentioned control pipe may flow to said fluid pressure operated means, a cut-off valve device operative in response to an increase in the pressure of fluid in said brake cylinder for cutting off the flow of fluid under pressure from the first mentioned control pipe to said other control pipe and operative in response to a decrease in pressure in said brake cylinder for permitting fluid under pressure to flow from the first mentioned control pipe to said other control pipe, electro-responsive means operative when energized to permit fluid under pressure to flow from said other control pipe to said fluid pressure operated means when said cut-off valve device is in said other position, and a voltage responsive relay operative only upon a predetermined drop in the storage battery voltage for effecting the operation of said electro-responsive means.

24. In a vehicle having a fluid pressure brake equipment comprising a brake pipe normally charged with fluid under pressure and a brake controlling valve device operative to one position upon a reduction in brake pipe pressure for supplying fluid under pressure to effect an application of the brakes and operative to another position upon an increase in brake pipe pressure for venting fluid under pressure to effect a release of the brakes, in combination, an electric lighting circuit including a storage battery, an electric generator for supplying current to said battery, a motor operative by fluid under pressure for driving said generator, a control pipe through which fluid under pressure may flow to said motor, electro-responsive means operative when energized to admit fluid under pressure from said control pipe to said motor, voltage responsive means for effecting energization of said electro-responsive means when the voltage in said battery has dropped to a predetermined low value, and means operative to establish communication from said brake pipe to said control pipe through which fluid under pressure may flow from the brake pipe only when said control valve device is in said other position.

25. In a vehicle having a fluid pressure brake equipment comprising a brake pipe normally charged with fluid under pressure and a brake controlling valve device operative to one position upon a reduction in brake pipe pressure for supplying fluid under pressure to effect an application of the brakes and operative to another position upon an increase in brake pipe pressure for venting fluid under pressure to effect a release of the brakes, in combination, an electric lighting circuit including a storage battery, an electric generator for supplying current to said battery, a motor operative by fluid under pressure for driving said generator, a control pipe through which fluid under pressure may flow to said motor, electro-responsive means operative when energized to admit fluid under pressure from said control pipe to said motor, current responsive means for effecting energization of said electro-responsive means, and means for supplying fluid under pressure to said control pipe when said controlling valve device is operated to said other position and for cutting off the supply of fluid under pressure to said control pipe when said controlling valve device is operated to the first mentioned position.

26. In a vehicle having a fluid pressure brake equipment comprising a brake pipe normally charged with fluid under pressure and a brake controlling valve device operative to one position upon a reduction in brake pipe pressure for supplying fluid under pressure to effect an application of the brakes and operative to another position upon an increase in brake pipe pressure for venting fluid under pressure to effect a release of the brakes, in combination, an electric lighting circuit including a storage battery, an electric generator for supplying current to said battery, a motor operative by fluid under pressure for driving said generator, a control pipe through which fluid under pressure may flow to said motor, electro-responsive means operative when energized to admit fluid under pressure from said control pipe to said motor, current responsive means operative by the current in said circuit for effecting energization of said electro-responsive means, means for supplying fluid under pressure to said control pipe when said controlling valve device is operated to said other position and for cutting off the supply of fluid under pressure to said control pipe when said controlling valve device is operated to the first mentioned position, and means for insuring the supply of fluid under pressure to said control pipe for a predetermined interval of time after said controlling valve device is operated to the first mentioned position.

27. In a vehicle having a fluid pressure brake system and an electric lighting system including a lighting circuit having a storage battery, in combination, an electric generator associated with said lighting system for charging said battery, a motor operative upon the supply of fluid under pressure thereto for driving said generator, a communication through which fluid under pressure may be supplied for driving said motor, means subject to opposing fluid pressures and operative in response to an increase in one of said fluid pressures for admitting fluid under pressure from the fluid pressure brake system to said communication and operative in response to a decrease in the last mentioned fluid pressure for cutting off the flow of fluid from the brake system to the communication, and means included in the brake system operative in effecting a release of the brakes to increase the last mentioned fluid pressure and operative in effecting an application of the brakes to decrease the fluid pressure.

28. In a vehicle having a fluid pressure control system and an electric lighting system including a lighting circuit having a storage battery, in combination, an electric generator for charging said battery, a motor operative upon the supply of fluid under pressure thereto for driving said generator, a communication through which fluid under pressure may be supplied for driving said motor, and means operative as an incident to a certain operation of the fluid pressure control system for admitting fluid under pressure from the control system to said communication and operative as an incident to a different operation of the fluid pressure control system for cutting off the flow of fluid to the communication.

29. In a vehicle having a fluid pressure control system and an electric lighting system including a lighting circuit having a storage battery, in combination, an electric generator for charging said battery, a motor operative upon the supply of fluid under pressure thereto for driving said generator, a communication through which fluid under pressure may be supplied for driving said motor, and fluid pressure responsive means operative upon the supply of fluid under pressure thereto for admitting fluid under pressure from said control system to said communication and operative upon the release of fluid under pressure therefrom for cutting off the flow of fluid to said communication, and means included in the control system operative to control the supply of fluid under pressure to and the release of fluid under pressure from said fluid pressure responsive means.

30. In a vehicle having a fluid pressure control system and an electric lighting system including a lighting circuit having a storage battery, in combination, an electric generator for charging said battery, a motor operative upon the supply of fluid under pressure thereto for driving said generator, a communication normally charged with fluid under pressure from the control system, electrical means operative in response to the flow of current in said lighting circuit to effect the flow of fluid under pressure through said communication to said motor, and means for so controlling the rate of flow of fluid to said motor that such flow will not effect unwanted operations of the fluid pressure control system.

ELLIS E. HEWITT.
CLAUDE M. HINES.